US007432495B2

(12) United States Patent
Baumann

(10) Patent No.: US 7,432,495 B2
(45) Date of Patent: Oct. 7, 2008

(54) SENSOR ARRANGEMENT FOR A COATING SYSTEM

(75) Inventor: Michael Baumann, Flein (DE)

(73) Assignee: Durr Systems, Inc., Plymouth, MI (US)

( * ) Notice: Subject to any disclaimer, the term of this patent is extended or adjusted under 35 U.S.C. 154(b) by 137 days.

(21) Appl. No.: 11/427,958

(22) Filed: Jun. 30, 2006

(65) Prior Publication Data

US 2007/0145250 A1 Jun. 28, 2007

Related U.S. Application Data

(62) Division of application No. 10/653,444, filed on Sep. 2, 2003, now abandoned.

(30) Foreign Application Priority Data

Sep. 2, 2002 (DE) ................................ 102 40 451

(51) Int. Cl.
*G01D 5/34* (2006.01)
*G01P 3/36* (2006.01)
*B05C 11/00* (2006.01)

(52) U.S. Cl. .................................. 250/231.13; 118/712

(58) Field of Classification Search ................................ 250/231.13–231.18; 118/663, 712
See application file for complete search history.

(56) References Cited

U.S. PATENT DOCUMENTS

| | | | | |
|---|---|---|---|---|
| 3,691,819 | A | 9/1972 | Guest | |
| 3,837,214 | A | 9/1974 | Guest | |
| 4,376,135 | A | 3/1983 | Patel et al. | |
| 4,521,462 | A | 6/1985 | Smythe | |
| 4,572,437 | A | 2/1986 | Huber et al. | |
| 4,589,597 | A | 5/1986 | Robisch et al. | |
| 4,684,064 | A | 8/1987 | Kwok | |
| 4,715,314 | A | 12/1987 | Ramseier et al. | |
| 4,724,317 | A * | 2/1988 | Brown et al. | 356/28 |
| 4,852,810 | A | 8/1989 | Behr et al. | |
| 4,919,333 | A | 4/1990 | Weinstein | |
| 4,927,081 | A | 5/1990 | Kwok et al. | |
| 4,944,459 | A | 7/1990 | Watanabe et al. | |
| 4,955,960 | A | 9/1990 | Behr et al. | |
| 5,011,086 | A | 4/1991 | Sonnleitner et al. | |
| 5,078,321 | A | 1/1992 | Davis et al. | |
| 5,127,125 | A | 7/1992 | Skibowski | |
| 5,218,305 | A | 6/1993 | Lunzer | |
| 5,294,217 | A | 3/1994 | Talacko et al. | |
| 5,300,006 | A | 4/1994 | Tanaka et al. | |
| 5,397,063 | A | 3/1995 | Weinstein | |
| 5,622,563 | A | 4/1997 | Howe et al. | |

(Continued)

FOREIGN PATENT DOCUMENTS

DE 41 05 116 A1 8/1992

(Continued)

*Primary Examiner*—John R Lee
(74) *Attorney, Agent, or Firm*—Howard & Howard Attorneys, P.C.

(57) ABSTRACT

The invention concerns a sensor arrangement for a coating system for coating workpieces, with at least one sensor for detecting at least one operating quantity of the coating system and for generating a corresponding sensor signal, a transmitter connected to the sensor for transmitting the sensor signal, a receiver for receiving the sensor signal transmitted by the transmitter, and a wireless connection between the transmitter and receiver.

10 Claims, 2 Drawing Sheets

U.S. PATENT DOCUMENTS

| | | | | | |
|---|---|---|---|---|---|
| 5,633,306 | A | | 5/1997 | Howe et al. | |
| 5,660,334 | A | * | 8/1997 | Trusty et al. | 239/691 |
| 5,662,278 | A | | 9/1997 | Howe et al. | |
| 5,683,032 | A | | 11/1997 | Braslaw et al. | |
| 5,704,977 | A | * | 1/1998 | Baumann et al. | 118/323 |
| 5,865,380 | A | * | 2/1999 | Kazama et al. | 239/704 |
| 5,886,350 | A | * | 3/1999 | Cook et al. | 250/225 |
| 6,037,010 | A | | 3/2000 | Kahmann et al. | |
| 6,090,450 | A | | 7/2000 | Kahmann et al. | |
| 6,508,610 | B2 | | 1/2003 | Dietrich | |
| 6,589,348 | B2 | | 7/2003 | Ott | |
| 6,935,575 | B2 | | 8/2005 | Lacchia et al. | |
| 7,038,192 | B2 | * | 5/2006 | Lu et al. | 250/231.13 |
| 2002/0064601 | A1 | | 5/2002 | Ott | |

FOREIGN PATENT DOCUMENTS

| | | | |
|---|---|---|---|
| DE | 43 06 800 | A1 | 9/1994 |
| DE | 43 42 128 | A1 | 6/1995 |
| DE | 196 10 588 | A1 | 9/1997 |
| DE | 197 09 988 | A1 | 10/1998 |
| DE | 197 42 588 | A1 | 4/1999 |
| DE | 198 30 029 | A1 | 1/2000 |
| DE | 199 09 369 | A1 | 9/2000 |
| DE | 199 37 425 | A1 | 3/2001 |
| DE | 100 33 986 | A1 | 1/2002 |
| DE | 100 63 234 | C1 | 7/2002 |
| DE | 101 30 173 | A1 | 1/2003 |
| EP | 0 767 005 | A1 | 4/1997 |
| EP | 0 904 848 | A1 | 3/1999 |
| EP | 0 967 016 | A1 | 12/1999 |
| EP | 1 108 475 | A2 | 6/2001 |
| EP | 1 114 677 | A1 | 7/2001 |
| EP | 0 796 663 | B1 | 8/2001 |
| EP | 1 172 152 | A1 | 1/2002 |
| EP | 1 331 037 | A3 | 10/2005 |
| GB | 2 159 954 | A | 12/1985 |
| WO | WO 94/22589 | | 10/1994 |
| WO | WO 00/07741 | | 2/2000 |
| WO | WO 01/91914 | A1 | 12/2001 |

* cited by examiner

SENSOR ARRANGEMENT FOR A COATING SYSTEM

This is a divisional patent application that claims priority to a patent application Ser. No. 10/653,444 filed on Sep. 2, 2003 now abandoned.

BACKGROUND OF THE INVENTION

1. Field of the Invention

The invention concerns a sensor arrangement for a coating system according to the preamble of Claim 1 and also a coating system with such a sensor arrangement.

2. Relevant Prior Art

In modem painting systems, known rotary atomizers are used for which a so-called bell-shaped plate is driven by a compressed-air turbine at high rpm. The bell-shaped plate usually has the form of a truncated cone and expands in the spray direction, with the coating agent to be applied being accelerated in the axial direction and especially in the radial direction in the truncated cone-like bell-shaped plate due to centrifugal forces, so that a conical spray stream is produced at the outer edge of the bell-shaped plate.

From DE 43 06 800 A1, it is further known to measure the rpm of the compressed-air turbine. Here, reflective markings are applied onto the turbine wheel of the compressed-air turbine. These markings rotate with the turbine wheel and are detected by a stationary optical sensor by means of optical fibers. For achieving good painting results, the rotary atomizer with the compressed-air turbine is set to a high voltage, while the workpieces to be painted and the optical sensor are electrically grounded.

The use of flexible optical fibers for detecting the optical markings on the turbine wheel enables a stationary arrangement of the optical sensor and potential isolation of the sensor relative to the high voltage of the rotary atomizer.

A disadvantage of this known sensor arrangement with optical fibers is first the fact that for converting the optical signals transmitted in the optical fibers into an electrical signal, a relatively large number of optoelectrical converters is required.

Secondly, for an optical fiber connection, only a relatively small number of separation points is possible, because transmission losses occur at each separation point. For increasing component modularity of modem coating systems, with a corresponding increase in the number of separation points, the known optical fiber technology thus runs into its limitations.

Furthermore, optical fibers are relatively sensitive to breaks, which can lead to operational failure of the rpm measurement system for an excess mechanical load on the sensor arrangement.

The invention is thus based on the problem of improving the previously described known sensor arrangement to the effect that greater component modularity is possible. The mechanical load capacity should be as large as possible.

SUMMARY OF THE INVENTION AND ADVANTAGES

The task is solved starting with the known sensor arrangement described in the introduction according to the preamble of Claim 1 by the characterizing features of Claim 1.

The invention includes the general technical teaching of providing a transmitter and a receiver for transmitting the sensor signal, with a wireless connection between the transmitter and the receiver. An advantage of a wireless connection between the transmitter and the receiver is first the unlimited mechanical load capacity of the connection, whereas a connection by means of optical fibers is relatively sensitive to breaks. Secondly, a wireless connection between the transmitter and the receiver advantageously enables arbitrary component modularity, since, in contrast to optical fibers, there are no separation points at the transitions between the individual modules.

The use according to the invention of a wireless connection with a transmitter and a receiver advantageously enables an arrangement of the sensor in a moving component of a coating system, whereas the sensor for the known sensor arrangement described in the introduction is stationary and is connected by optical fibers to the moving rotary atomizer.

For the sensor arrangement according to the invention, the sensor is preferably formed on a moving part of the coating system, while the receiver is stationary. However, the relative motion between the transmitter and the receiver during the operation of the coating system does not lead to mechanical loading of the connection or to mechanical wear and tear, because the connection between the transmitter and the receiver is wireless.

Preferably, the transmitter is a radio transmitter and the receiver is a corresponding radio receiver, with a wireless radio connection between the radio transmitter and the radio receiver.

However, as an alternative it is also possible that the transmitter is an optical transmitter and the receiver is an optical receiver, with an optical connection between the optical transmitter and the optical receiver. For example, for transmitting the sensor signals an infrared transmitter is used, whose signal is received by an infrared receiver.

Furthermore there is the possibility that the transmitter is an acoustic transmitter and the receiver is a corresponding acoustic receiver. For example, for transmitting the sensor signals an ultrasonic transmitter is used, whose signal is detected by an ultrasonic receiver.

In addition, the wireless connection between the transmitter and the receiver enables electric potential isolation, so that the transmitter on one side and the receiver on the other side can be at different electric potentials. This is particularly advantageous for use in an electrostatic coating system with a rotary atomizer, because here the rotary atomizer is typically at a high voltage, while the workpieces to be coated are grounded. Thus, the transmitter can also be at a high voltage for the sensor arrangement according to the invention, while the receiver is at a low voltage or at ground.

The sensor can be, e.g., a pressure sensor, which measures a pressure quantity of the coating system, such as the pressure of a medium (air, coating agent, solvent) of the coating system. Here, a few pressure quantities to be measured, which are named only as examples, include the drive air pressure, the steering air pressure, the solvent pressure, the paint pressure, and the line pressure.

In one variant of the invention, the sensor detects the position, the regulating speed, and/or the state of a component of the coating system.

For example, the sensor can be a smart-pig sensor, which detects the position, speed, and/or a characteristic of a smart pig. Here, the smart-pig sensor can output a signal when the smart pig has passed a certain line section or when the smart pig is located in the line section.

Furthermore, in the scope of the invention, there is the possibility that the sensor detects the position of a nozzle needle of the coating system, with the needle preferably being the main needle of a rotary atomizer.

The sensor can further detect the position of a cylinder of a piston dosing device or a piston pump of a coating system.

In addition, there is also the possibility that the sensor is a rotational quantity sensor, which detects the rpm, the rotational angle, and/or the direction of rotation of a turbine wheel of a rotary atomizer.

Finally, the sensor can also detect the position and/or the regulating speed of one or more shafts of a painting robot of the coating system.

In addition to the previously described sensor arrangement, the invention also includes a complete coating system with such a sensor arrangement.

BRIEF DESCRIPTION OF THE DRAWINGS

Other advantageous refinements of the invention are characterized in the subordinate claims or are described in more detail in the following together with the description of the preferred embodiments of the invention with reference to the figures. Shown are:

DETAILED DESCRIPTION OF THE PREFERRED EMBODIMENT

Figure 1:
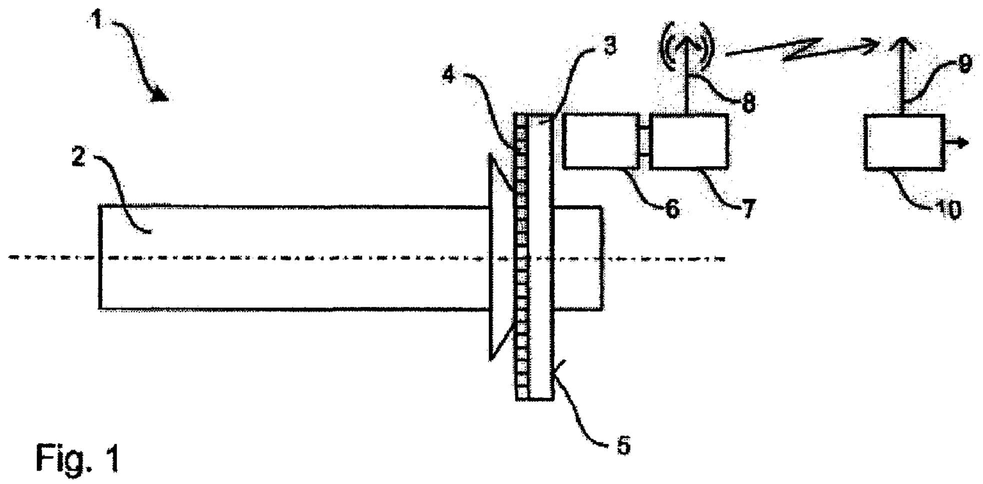
FIG. 1 shows a side view of a turbine wheel of a compressed-air turbine for driving a rotary atomizer with a sensor arrangement according to the invention.

The side view in FIG. 1 shows an essentially conventional turbine wheel 1, which can be used in a rotary atomizer turbine, which is known, e.g., from DE 43 06 800 C2. For the constructional configuration of the rotary atomizer turbine and the complete rotary atomizer, for simplification, refer to DE 43 06 800 C2, whose content is taken into account completely by the present description.

The turbine wheel 1 has a bell shaped-plate shaft 2, wherein in FIG. 1 a bell-shaped plate can be mounted on the left side of the bell shaped-plate shaft 2. Furthermore, the turbine wheel 1 has a circular disk-shaped armature 3, with numerous turbine blades 4 distributed around the circumference on the bell shaped-plate end surface of the armature 3. During the operation of the rotary atomizer, the turbine blades 4 are driven by so-called drive air, which has been known for a long time.

On the end surface of the armature 3 facing away from the bell-shaped plate, there is an optical marking, which enables both a determination of the rotational velocity of the turbine wheel 1 and also a determination of the rotational direction of the turbine wheel 1. The optical marking consists of several circle-segment coatings, which are applied to the end surface 5 distributed over the periphery.

On the side of the armature 3 facing away from the bell-shaped plate there is an optical sensor 6, which detects the different reflective capacities of the optical markings and the otherwise matte end surface 5 and transmits a corresponding electrical signal to a transmitter 7.

The transmitter 7 emits a radio signal by means of an antenna 8. This signal is received over an antenna 9 by a receiver 10, wherein the antennas 8, 9 are shown here only schematically. The receiver 10 then outputs a corresponding electrical signal, from which an evaluation unit can determine the rpm and direction of rotation of the turbine wheel 1.

Here, the transmitter 7 is arranged in the rotary atomizer, which can be moved by a painting robot. In addition, the transmitter 7 with the sensor 6 and the antenna 8 are at a high voltage during the operation of the rotary atomizer, so that no electrical isolation of the receiver 7, the sensor 6, or the antenna 8 is required relative to the rotary atomizer.

In contrast, the receiver 10 is arranged stationary in the cabin wall of a painting cabin and is therefore exposed only to minimal mechanical loads during operation. In addition, the receiver 10 is grounded, with the wireless connection between the transmitter 7 and the receiver 10 providing potential isolation.

Figure 2:
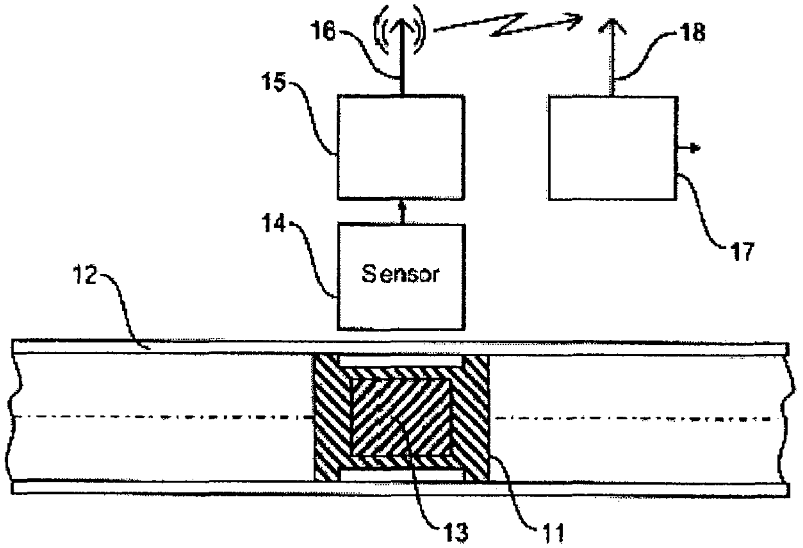
FIG. 2 shows a piggable line with a sensor arrangement for detecting the smart-pig position, and also

FIG. 2 shows another embodiment of a sensor arrangement according to the invention, which is used to determine the position of a smart pig 11 in a piggable line 12. Here, the smart pig 11 has a permanent magnet 13, which controls a magnetic field sensor 14, with the magnetic field sensor 14 being arranged on the outside of the line 12.

When the smart pig 11 is located at the position shown in FIG. 2, the magnetic field sensor 14 generates an electric signal based on the permanent magnet 13. This signal is transmitted to a transmitter 15. The transmitter 15 then emits a corresponding radio signal over an antenna 16, wherein the radio signal is received by a receiver 17 over an antenna 18. The receiver 17 then transmits a corresponding electrical signal to an evaluation unit. For simplification, the evaluation unit is not shown.

Here, numerous sensors can be provided within the line system. These sensors transmit their signals to a central receiver, so that the evaluation unit can detect the positions of all smart pigs.

Figure 3:
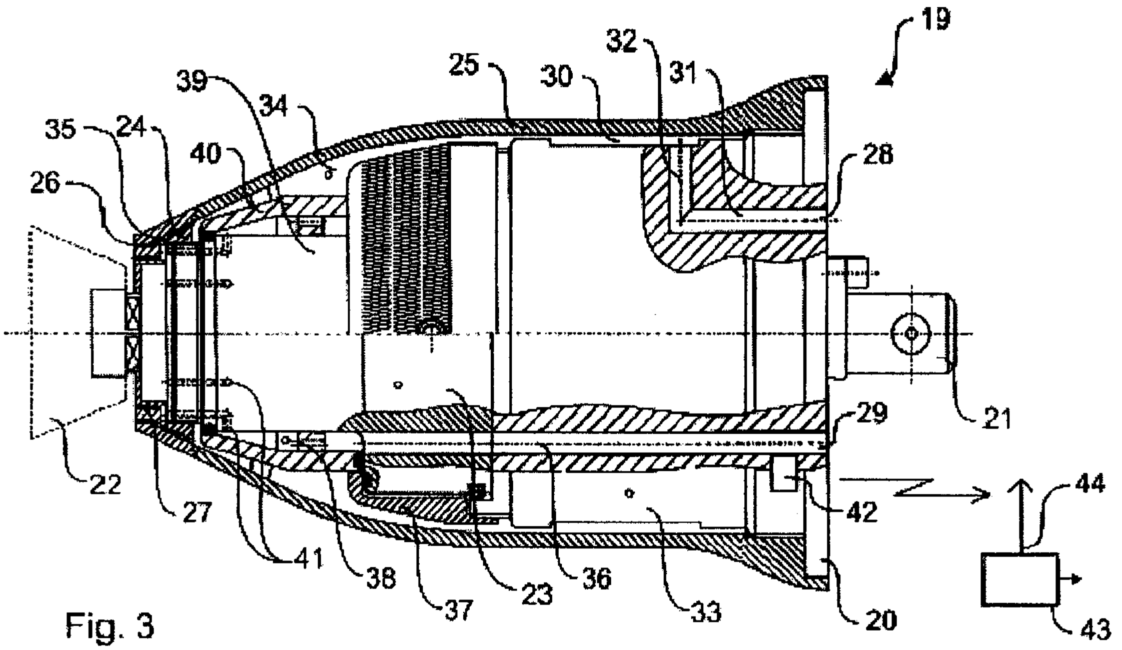
FIG. 3 shows a rotary atomizer with a sensor arrangement according to the invention for pressure measurement.

The cross-sectional view shown in FIG. 3 shows a rotary atomizer 19, which essentially has a conventional configuration, so that as a supplement to the following description, one may reference the cited state of the art.

For assembling the rotary atomizer 19, this has on its mounting-side end surface an attachment flange 20 with an attachment pin 21, which enables mechanical attachment to a robot arm of a painting robot.

A conventional, truncated cone-like bell-shaped plate 22 is attached to the rotary atomizer 19. The bell-shaped plate is shown here only with dashed lines and is driven during operation of the rotary atomizer 19 by a compressed-air turbine 23 with a high rpm. The rotation of the bell-shaped plate 22 leads to the situation where the coating medium fed into the interior of the bell-shaped plate 22 is accelerated in the axial direction and particularly in the radial direction and is sprayed at an outer edge of the bell-shaped plate.

Here, the drive of the compressed-air turbine 23 is realized by compressed air, which is fed by the painting robot over the attachment flange 20, wherein the supply of drive air is not shown here for simplification.

Furthermore, for shaping the spray stream output by the bell-shaped plate 22, a so-called steering air ring 24 is provided, which is arranged in the bell shaped-plate side end surface of a housing 25 of the rotary atomizer 19. In the steering air ring 24 there are several steering air nozzles 26, 27, which are directed in the axial direction and by means of which, during operation of the rotary atomizer 19, a steering air current can be blown outwards onto the conical surface shell of the bell-shaped plate 22. Depending on the amount and velocity of the steering air blown from the steering air nozzles 26, 27, the spray stream is formed and the desired spray width is set.

Here, the supply of steering air for the two steering air nozzles 26, 27 is realized by corresponding flange openings 28, 29, which are arranged in the attachment flange 20 of the rotary atomizer 19. The position of the flange openings 28, 29 within the end surface of the attachment flange 20 is set by the position of the corresponding attachments to the associated attachment flange of the painting robot.

The outer steering air nozzle 26 is supplied by a steering air line 30, which is led along the outside of the compressed-air turbine 23 between the housing 25 and the compressed-air turbine 23. Here, the flange opening 28 first opens into an axial needle hole 31, which then transitions into a radial needle hole 32, with the radial needle hole 32 finally opening at the outside of a valve housing 33 into an intermediate space between the housing 25 and the valve housing 33. The steering air is then fed past the compressed-air turbine 23 into an air space 34. From this location, the steering air is finally led by needle holes 35 into the steering air ring 24 to the steering air nozzle 26.

In contrast, the supply of steering air for the steering air nozzle 27 is realized by a steering air line 36, which starts in the axial direction from the flange opening 29 in the attachment flange 20 and passes through the valve housing 33 without kinks. In addition, the steering air line 36 also goes in the axial direction through a bearing unit 37 of the compressed-air turbine 23. Here, the radial distance of the steering air line 36 from the axis of rotation of the bell-shaped plate 22 is greater than the outer diameter of the turbine wheel not shown for simplification, so that the steering air line 36 runs on the outside of the turbine wheel. The steering air line 36 then opens on the bell shaped-plate side into another air space 38, which is arranged between an essentially cylindrical section 39 of the compressed-air turbine 23 and a cover 40 surrounding this turbine.

In the surface shell of the section 39, several holes 41 are located, which open in the bell shaped-plate end surface of the compressed-air turbine 23 and finally supply the steering air nozzles 27. The holes 41 in the section 39 of the compressed-air turbine 23 consist of a needle hole running in the radial direction starting from the surface shell of the section 39 and a needle hole running in the axial direction starting from the bell shaped plate-side end surface of the section 39, which enables simple assembly.

Here, a pressure sensor 42 with an integrated radio transmitter opens in the steering air line 36 near the attachment flange 20, wherein the pressure sensor 42 measures the steering air pressure and transmits a corresponding radio signal by the radio transmitter.

This radio signal is received by a receiver 43 by means of an antenna 44 and is forwarded to an evaluation unit, wherein the evaluation unit is not shown for simplification.

The invention is not limited to the previously described preferred embodiments. Instead, a plurality of variants and modifications are conceivable, which also use the concept of the invention and therefore fall within the scope of protection.

The invention has been described in an illustrative manner, and it is to be understood that the terminology which has been used is intended to be in the nature of words of description rather than limitation.

Obviously, many modifications and variations of the present invention are possible in light of the above teachings it is, therefore, to be understood that within the scope of the appended claims, wherein reference numerals are merely for convenience and not to be in any way limiting, the invention may be practiced otherwise than as specifically described.

The invention claimed is:

1. A sensor arrangement for a turbine wheel assembly of a rotary atomizer comprising;

a shaft, a disk rotatable with said shaft and defining a marking surface, a sensor positioned for reflectively detecting rotational velocity and direction of said turbine wheel assembly as said disk rotates about said sensor thereby generating an electrical signal, a transmitter receiving said electrical signal and emitting a wireless signal corresponding said electric signal, an evaluation unit, and a receiver spaced from said sensor for receiving said wireless signal from said transmitter thereby relaying said wireless signal to said evaluation unit for determining the rotational velocity and direction of said turbine wheel assembly.

2. A sensor arrangement as set forth in claim 1, wherein said sensor is an optical sensor.

3. A sensor arrangement as set forth in claim 2, further including a plurality of turbine blades connected to said disk and spaced from said marking surface with said blades exposed to air for rotating said shaft.

4. A sensor arrangement as set forth in claim 3, wherein said disk is further defined by a circular armature.

5. A sensor arrangement as set forth in claim 4, wherein said transmitter includes a first antenna and said receiver includes a second antenna with said first antenna and said second antenna presenting an operative communication as said electric signal is transmitted between said first antenna and said second antenna.

6. A sensor arrangement as set forth in claim 5, wherein said receiver is grounded.

7. A sensor arrangement as set forth in claim 6, wherein said receiver is a radio receiver.

8. A sensor arrangement as set forth in claim 1, wherein said receiver has a first potential.

9. A sensor arrangement as set forth in claim 8, wherein said transmitter has a second potential different from said first potential.

10. A sensor arrangement for a turbine wheel assembly of a rotary atomizer comprising;

a shaft, a disk rotatable with said shaft and having opposing sides with one of said opposing sides defining a marking surface and a plurality of turbine blades connected to the other of said opposing sides with said blades exposed to air for rotating said shaft, an optical sensor positioned for reflectively detecting rotational velocity and direction of said turbine wheel assembly as said disk rotates about said sensor thereby generating an electrical signal, a radio transmitter of a first electrical potential including a first antenna adaptable for receiving said electrical signal and emitting a wireless signal corresponding said electric signal, an evaluation unit, and a receiver of a second electrical potential having a second antenna operatively communicated with said first antenna with said receiver being spaced from said sensor for receiving said wireless signal from said radio transmitter thereby relaying said wireless signal to said evaluation unit for determining the rotational velocity and direction of said turbine wheel assembly as said electric signal is transmitted between said first antenna and said second antenna.

* * * * *